(12) United States Patent
McCabe

(10) Patent No.: US 7,466,481 B2
(45) Date of Patent: Dec. 16, 2008

(54) BINOCULAR WITH DISPARATE FIELDS OF VIEW

(76) Inventor: Timothy Lee McCabe, 11 Highland Ct., Albany, NY (US) 12203

( * ) Notice: Subject to any disclaimer, the term of this patent is extended or adjusted under 35 U.S.C. 154(b) by 269 days.

(21) Appl. No.: 11/353,752

(22) Filed: Feb. 14, 2006

(65) Prior Publication Data
US 2007/0188860 A1 Aug. 16, 2007

(51) Int. Cl.
G02B 23/00 (2006.01)
(52) U.S. Cl. .................... 359/420; 359/407
(58) Field of Classification Search ............. 359/420, 359/407
See application file for complete search history.

(56) References Cited

U.S. PATENT DOCUMENTS

| | | | | |
|---|---|---|---|---|
| 1,290,777 | A * | 1/1919 | O'Brien ............... | 359/420 |
| 1,851,579 | A | 3/1932 | Hixon | |
| 2,256,587 | A * | 9/1941 | Ames, Jr. et al. ...... | 351/160 R |
| 2,388,673 | A * | 11/1945 | Brown ................. | 359/420 |
| 2,409,186 | A * | 10/1946 | Bouwers .............. | 359/364 |
| 2,619,874 | A * | 12/1952 | Lane .................. | 359/420 |
| 3,572,886 | A * | 3/1971 | Curtiss et al. ........ | 359/420 |
| 3,865,468 | A | 2/1975 | Holcomb | |
| 3,873,182 | A | 3/1975 | Furuhashi | |
| 4,483,598 | A * | 11/1984 | Leightner et al. ...... | 359/420 |
| 4,698,336 | A * | 10/1987 | Saito et al. ........... | 514/202 |
| 4,806,005 | A | 2/1989 | Schneider et al. | |
| 4,848,887 | A | 7/1989 | Addy et al. | |
| 4,886,347 | A | 12/1989 | Monroe | |
| 5,000,556 | A | 3/1991 | Katsuma | |
| 5,189,512 | A | 2/1993 | Cameron et al. | |
| 5,349,469 | A * | 9/1994 | Francis ............... | 359/420 |
| 5,469,293 | A | 11/1995 | Fantone | |
| 5,485,307 | A | 1/1996 | Kim | |
| 5,583,692 | A | 12/1996 | Funatsu | |
| 5,633,753 | A | 5/1997 | Fantone et al. | |
| 5,930,036 | A * | 7/1999 | Cluff ................. | 359/420 |
| 5,969,858 | A | 10/1999 | Funatsu | |
| 6,149,272 | A | 11/2000 | Bergner et al. | |
| 6,239,918 | B1 * | 5/2001 | Young et al. .......... | 359/663 |
| 6,254,233 | B1 | 7/2001 | Prestandrea et al. | |
| 6,288,386 | B1 | 9/2001 | Bowen et al. | |
| 6,542,294 | B2 | 4/2003 | Funatsu | |
| 6,729,062 | B2 | 5/2004 | Thomas et al. | |
| 6,771,434 | B2 | 8/2004 | Hirunuma et al. | |
| 2003/0112506 | A1 | 6/2003 | Cromer | |
| 2003/0184859 | A1 | 10/2003 | Liang et al. | |
| 2004/0125444 | A1 | 7/2004 | Caplan et al. | |

* cited by examiner

*Primary Examiner*—Alessandro Amari
*Assistant Examiner*—Mark Consilvio
(74) *Attorney, Agent, or Firm*—Schmeiser, Olsen & Watts

(57) ABSTRACT

An improved binocular apparatus, system and method for presenting disparate fields of view is provided. The binocular apparatus and system differently magnifies optical transmissions pertaining to fields of view concurrently and simultaneously presents the optical transmissions pertaining to fields of view disparately.

10 Claims, 5 Drawing Sheets

BINOCULAR WITH DISPARATE FIELDS OF VIEW

FIELD OF INVENTION

This invention relates generally to the field of binoculars, and more particularly to binoculars having two monocular barrels presenting disparate fields of view.

BACKGROUND OF INVENTION

A standard binocular typically connotes the combination of an apparatus having two barrels housing identical lens systems. As a result, both barrels present a field of view at the same time, at the same magnification power. The strength of magnification of the binocular is determined by the lenses used and the design of the binocular as is well known in the art. Greater magnification makes it easier to discern objects at a distance, and provides a greater amount of detail to the viewed object. The greater the power of magnification, however, the lesser the field of view presented by the binocular. A limited field of view increases difficulty in targeting or tracking moving objects with precision and accuracy, especially when those objects are either small or moving at a high rate of speed.

Accordingly, there is a need for a binocular that concurrently presents disparate fields of view and allows for a detailed presentment of two concurrent magnified states simultaneously without adjusting the binocular. Additionally, there exists a need for an apparatus that can be used to transform a standard binocular into a binocular with disparate field of view lenses that is able to serve the purpose stated above.

SUMMARY OF INVENTION

The present invention provides improved apparatus and method for presenting disparate fields of view. The foregoing and other features of the invention will be apparent from the following more particular description of various embodiments of the invention.

A first general aspect of the invention provides a binocular comprising: a first barrel, containing a first optics system configured to provide a first magnification and a first field of view; and a second barrel operatively attached to the first barrel said second barrel containing a second optics system configured to provide a second magnification and a second field of view, said second magnification being less than said first magnification, wherein said second field of view is greater than said first field of view, further wherein said first field of view and said second field of view are simultaneously presented by the binocular.

A second general aspect of the invention provides a method of directing optical transmissions comprising: providing a binocular system configured to present disparate fields of view, magnifying differently concurrently optical transmissions pertaining to said disparate fields of view; and presenting said magnified optical transmissions pertaining to said disparate fields of view simultaneously.

A third general aspect of the invention provides a binocular transforming apparatus comprising: a module; a lens within the module configured to create a lesser magnification and a wider field of view when attached to a first barrel of the binocular; and an attachment system configured to operatively removably attach the module to the first binocular barrel

BRIEF DESCRIPTION OF DRAWINGS

Some of the embodiments of this invention will be described in detail, with reference to the following figures, wherein like designations denote like members, wherein.

DETAILED DESCRIPTION OF THE INVENTION

Although certain embodiments of the present invention will be shown and described in detail, it should be understood that various changes and modifications may be made without departing from the scope of the appended claims. The scope of the present invention will in no way be limited by the number of constituting components, the materials thereof, the shapes thereof, or the relative arrangement thereof. Rather, these factors are disclosed simply as an example of a potential embodiment. Although the drawings are intended to illustrate the present invention, the drawings are not necessarily drawn to scale.

Figure 1:
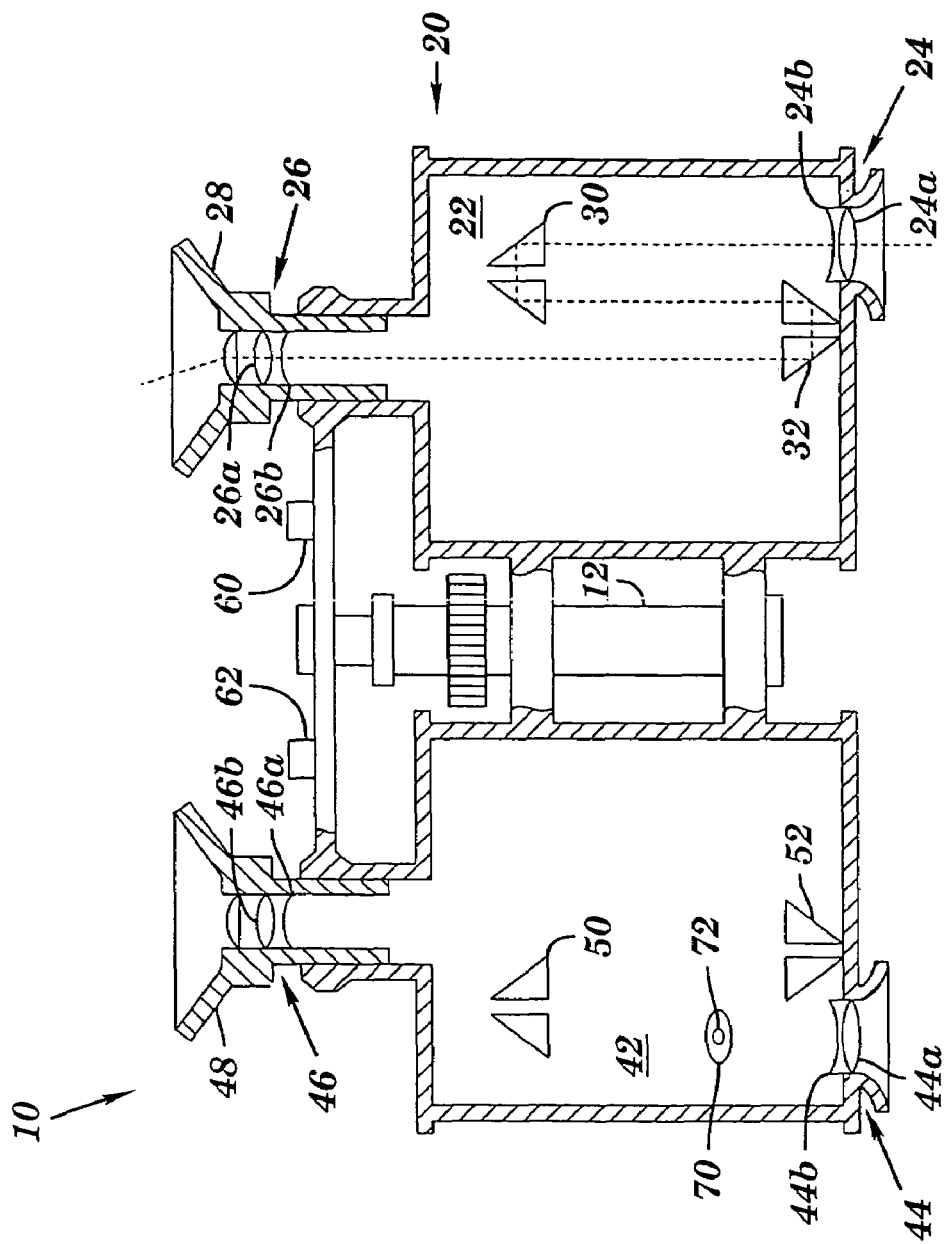
FIG. 1 depicts a sectional plan view of an embodiment of a binocular with disparate view lenses, in accordance with the present invention.

FIG. 1 depicts a sectional plan view of an embodiment of a binocular 10 with disparate view lenses. The binocular may be used in conjunction with daylight, infrared vision, night vision enhancing technologies, or other optical transmissions. The binocular 10 may have a first barrel 20 and a second barrel 40 that may be pivotally connected by a hinging mechanism 12. The barrels 20 and 40 may house a first optics system 22 and a second optics system 42, respectively (shown in FIG. 2). The first optics system 22 may comprise a first objective lens system 24, a first ocular lens system 26, and a first set of prisms 30 and 32, while the second optics system 42 may comprise a second objective lens system 44, a second ocular lens system 46, and a second set of prisms 50 and 52. The second optics system 42 may also include a reticle 70 having reticle markings 72. The functions of the optics systems 22 and 42 are well known within the relevant art and are briefly described below.

Figure 2:
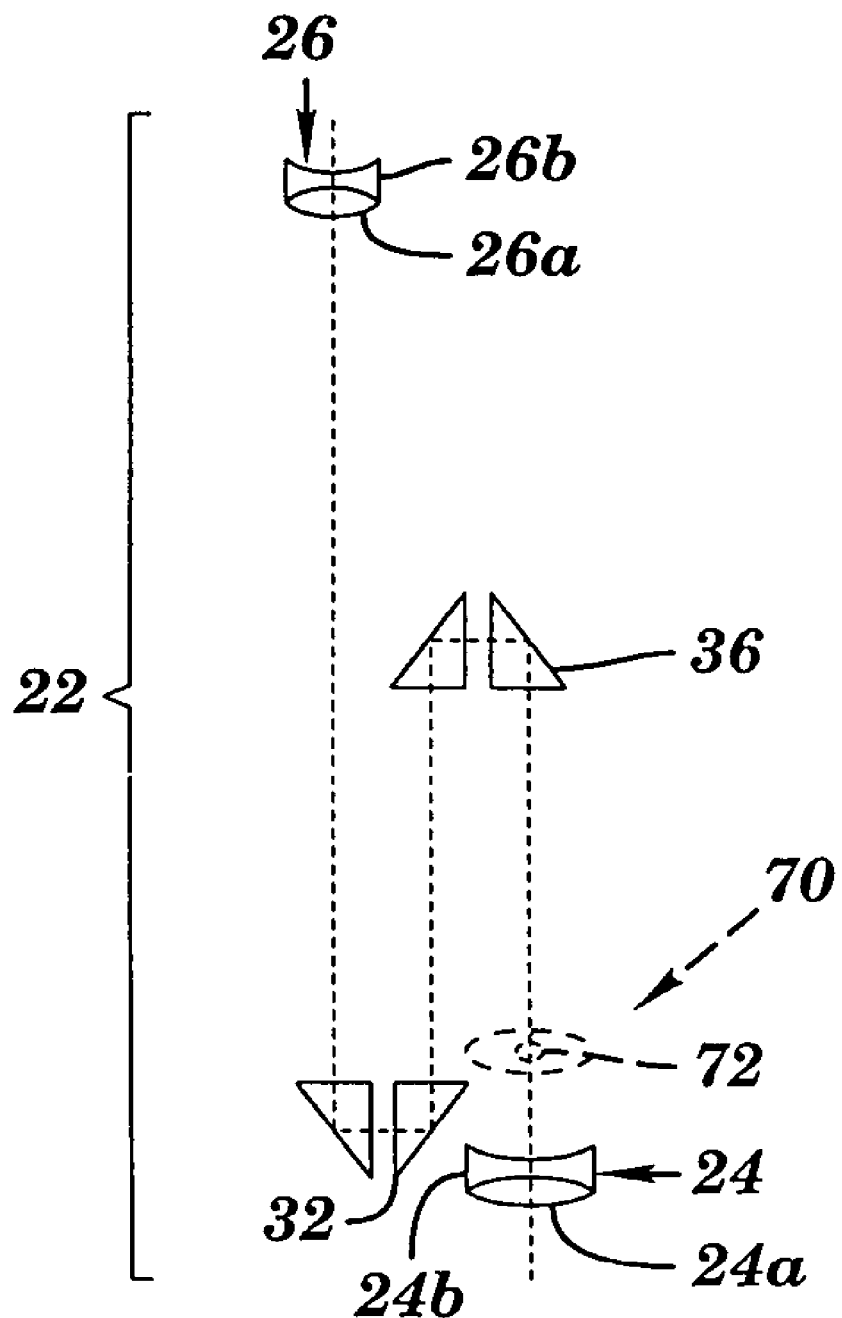
FIG. 2 depicts an embodiment of an optics system, in accordance with the present invention.

With continued reference to FIG. 1 and additional reference to FIG. 2, an illustrative example of how light may enter each of the barrels 20 and 40 and pass through their respective objective lens systems 24 and 44 is presented. The objective lens systems 24 and 44 may be mounted within the barrels 20 and 40. The objective lens systems 24 and 44 may each be comprised of a single biconvex lens or a plurality of lenses, such as lenses 24a-b and 44a-b. The objective lens systems 24 and 44 may form a real inverted image of a presented object. The objective lens systems 24 and 44 may also provide a low level of magnification of the viewed object to create an enlarged image.

The light may then pass through each of the two sets of prisms, set 30/32 and set 50/52, that may be mounted within each barrel, 20 and 40, respectively. Each prism set may serve to invert the image back to an upright orientation. The prism sets 30/32 and 50/52 may also allow the light to travel a greater distance, thus shortening the required length of the barrels 20 and 40.

The optical transmissions may then pass through each ocular lens system 26 and 46. The ocular lens systems 26 and 46 may be mounted respectively within eyepieces 28 and 48 through which the binocular presents the images of the field of view produced by the optics systems 22 and 42. The ocular lens systems 26 and 46 may be comprised either of a single biconvex converging lens, or a plurality of lenses, such as lenses 26a-b and 46a-b. The optics systems 22 and 42 may be configured such that the image received by each ocular lens system 26 and 46 may be less than one focal length away resulting in the production of a magnified image. The resulting presented optical image may be a virtual image that appears as an upright and enlarged field of view. The ocular lenses 26 and 46 may be moveable to provide for zoom magnification. Zoom magnification may be accomplished through focus knobs, an automatic toggle lever, a battery control, or by any other zooming alternatives known to those skilled in the art.

The extent of the magnification of the images or optical transmissions, as they may be presented through the eyepieces 28 and 48, may be determined by the effective magnification power of the optics systems 22 and 42. The magnification power of the optics systems 22 and 42 may be the magnification power of the objective lens systems 24 and 44 multiplied by the magnification power of the ocular lens systems 26 and 46, respectively. The magnification power of each optics system 22 and 42 may determine the concomitant field of view. Generally, the magnification power has an inverse relationship with the field of view that appears in each eyepiece, 28 and 48. That is, as the power of the magnification increases for the optics system 22 and 42, the field of view presented by the binocular in the respective eyepiece 28 and 48 correspondingly narrows.

The optics systems 22 and 42 may be configured to provide disparate fields of view. The first optics system 22 may provide a higher powered magnification, while the second optics system 42 may provide a lower powered magnification. The disparate magnifications may be achieved by varying the radii of curvature or the index of refraction of the lenses either in the objective lens systems 24 and 44, or the ocular lens systems 26 and 46. Increasing the radius of curvature for a single lens may decrease the power of magnification of that particular lens. Additionally, using a lens with a lower index of refraction may also serve to decrease the power of magnification of that particular lens. The different magnifications may also be achieved by positioning the lenses at different refractive distances from each other or by any other method known within the relevant art.

Figure 3:
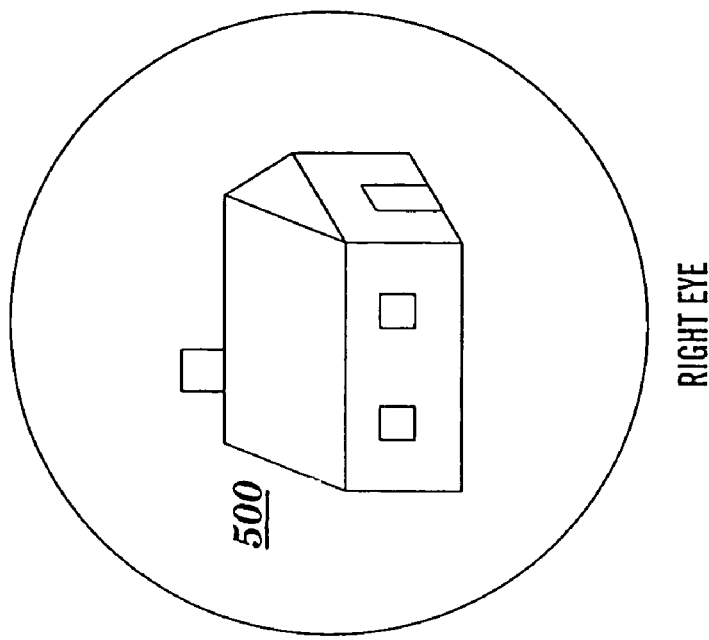
FIG. 3 depicts an embodiment the field of view from a first binocular barrel, in accordance with the present invention.
Figure 4:
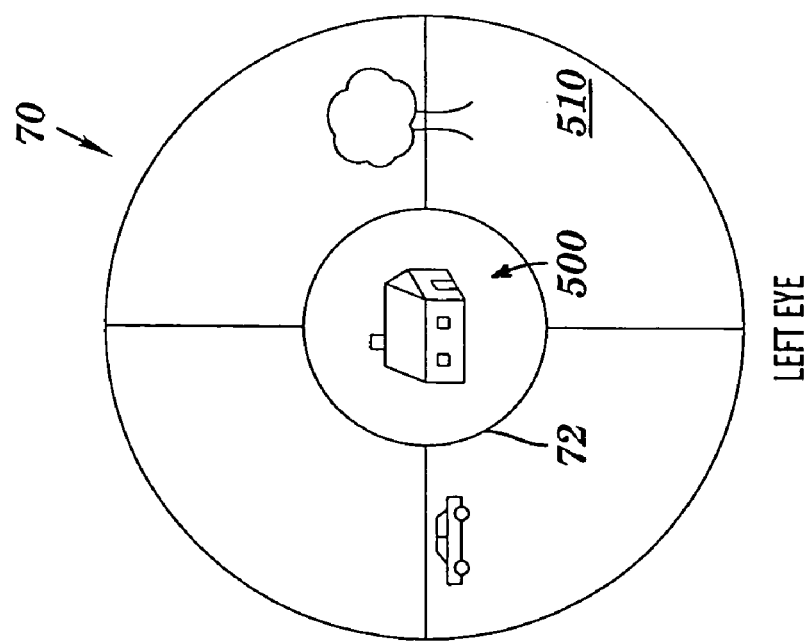
FIG. 4 depicts an embodiment of the field of view from a second binocular barrel employing a reticle, in accordance with the present invention.

FIGS. 3 and 4 depict a sample embodiment of a first field of view 500 and a sample embodiment of a second field of view 510 that may be rendered by the disparate field of view binocular 10 (shown in FIG. 1). FIG. 3 represents an embodiment of a sample first field of view 500 that may be presented through the first eyepiece 28. The first optics system 22 may provide a first magnification and the resulting first field of view 500. The first optics system may provide a high powered magnification that presents a detailed image of the view presented, while limiting the amount of surrounding view that will be presented through the first eyepiece 28. For example, the first field of view 500 may encompass a depicted object such as a building having detail presented pertaining to the building, wherein the detail shown corresponds with a first magnification associated with the first field of view. 500. The first magnification may fall within the range of approximately 8-20× with the resulting field of view being in the range of approximately 100-300 feet at 1000 yards.

FIG. 4 represents an embodiment of a sample second field of view that may be presented through the second eyepiece 48. The second optics system 42 may provide a second magnification that is less than the first magnification presented through eyepiece 28. As a result, the field of view presented in the second eyepiece 48 will be greater than the field of view presented in the first eyepiece 28. This presents an optical transmission that displays a central view 500 along with a significant portion of the surrounding environment comprising the second field of view 510, but yields less detail to the overall optical transmission as compared with central view 500. This configuration is well suited for targeting or tracking an object. The second magnification may fall in the range of approximately 4-7× with a corresponding second field of view in the range of approximately 400-600 feet at 1000 yards.

The binocular 10 with disparate view lenses will concurrently magnify the optical transmissions pertaining to said disparate fields of view differently. Moreover the binocular 10 with disparate view lenses will simultaneously present an object in a differently magnified state providing a great amount of detail presented in a first field of view 500 (as seen in FIG. 3) concurrently with the object as depicted in the wider second field of view 510 (as seen in FIG. 4) to target or track the object. Further, the binocular 10 simultaneously presents disparate fields of view, 500 and 510, without any adjustment to the binocular. For example, the embodied sample fields of view 500 and 510 may be presented to both eyes of a viewer, such that one eye of the view may behold view 500 while the other eye concurrently beholds view 510. Hence, the simultaneous view presented by binocular 10 may comprise, by way of example, the side-by-side presentation of views depicted in FIGS. 3-4.

Figure 6:
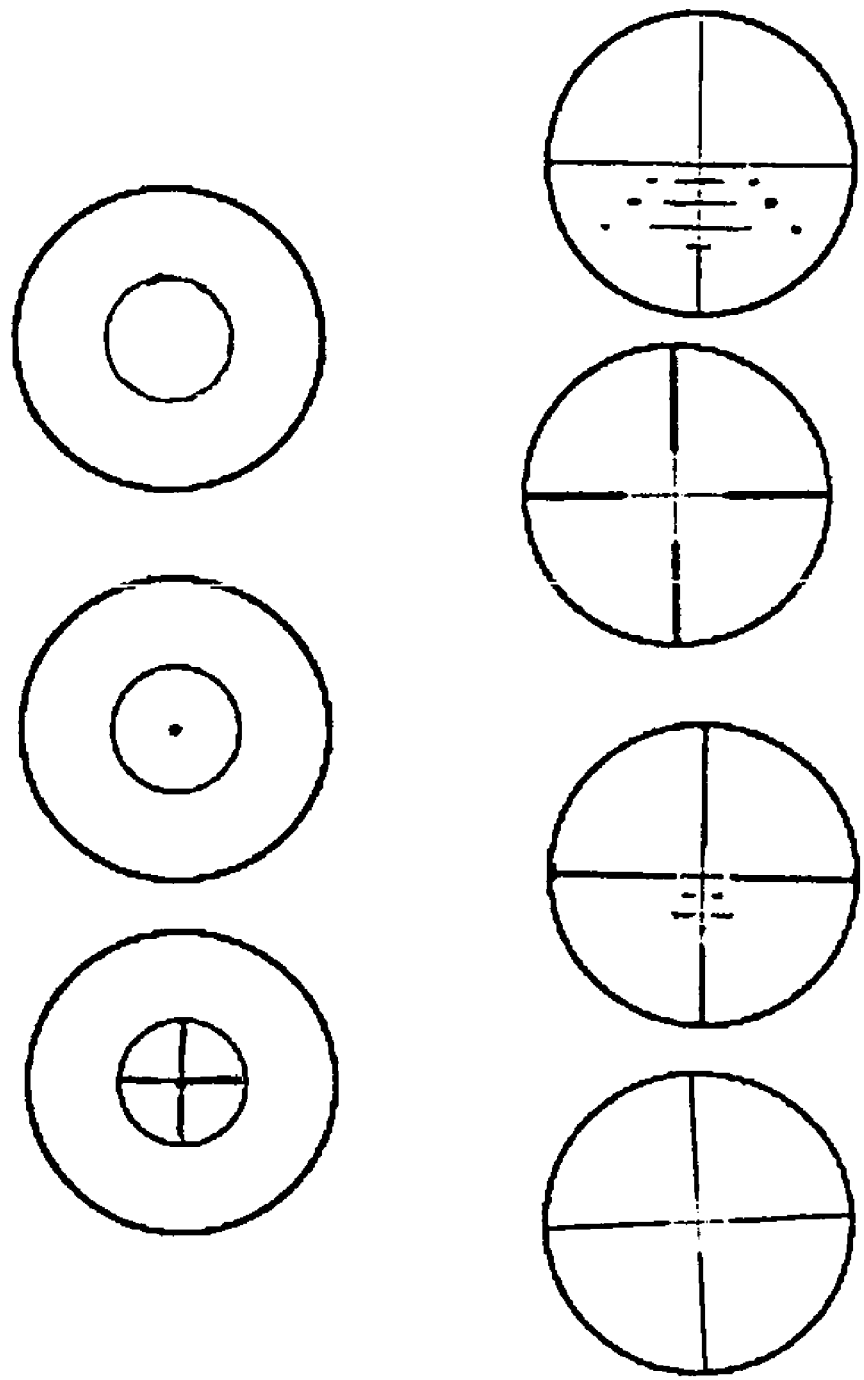
FIG. 6 depicts an array of potential reticle embodiments operable with the second barrel.

A reticle 70 may be mounted within the second barrel 40 in the focal plane of the second objective lens 44 (as shown in FIG. 1). The reticle may be a glass or plastic lens etched with markings 72 that correspond to the field of view that appears in the first eyepiece 28 as that view appears in second eyepiece 48. The reticle 70 may also be a projected image display such as an image produced by the refraction of laser light off an object much like a heads up display of images provided on the canopies of fighter planes or the windshields of automobiles. The markings 72 may exactly match the field of view, or in the alternative, may simply relate to that field of view (as shown in FIG. 3). The markings may be in any configuration known in the art of reticles suited to fulfill their stated purpose. FIG. 6 depicts an array of sample reticles that may be utilized to occur with the second field of view. Examples of such include but are not limited to those depicted in FIG. 6.

Figure 5:
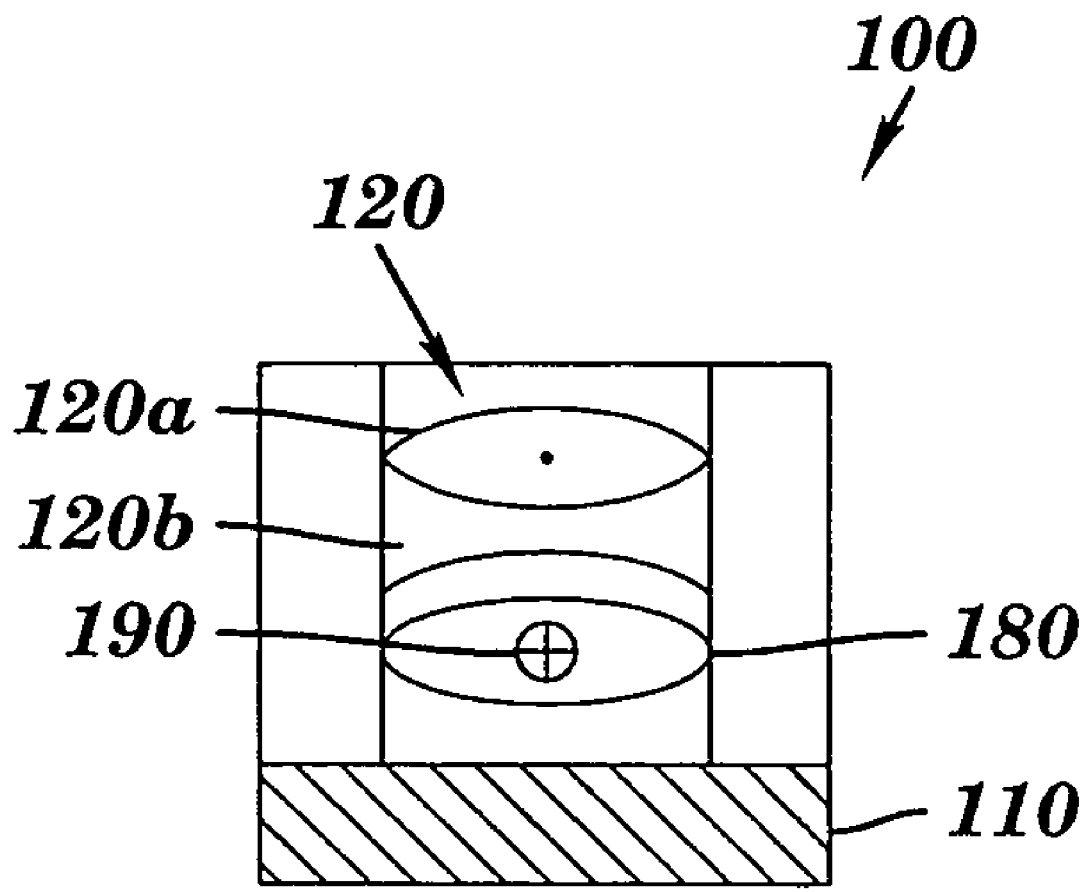
FIG. 5 depicts a sectional plan view of an embodiment of a module for transforming a standard binocular into a binocular with disparate view lenses, in accordance with the present invention.

FIG. 5 depicts a sectional plan view of a module 100 for transforming a standard binocular into a binocular with disparate view lenses. The module 100 may be operatively attached to either barrel of a standard binocular. A standard binocular may have exterior shape and form similar to the binocular 10 depicted in FIG. 1. The module 100 may contain an attachment element 110 to facilitate the attachment by covering the objective lens opening of a binocular barrel. The attachment element 110 may be any attachment element suitable for attaching the module to a standard binocular. The module 100 may contain a lens 120 mounted within the module. The lens 120 may serve to decrease the effective magnification power of the lens system located within the barrel 170. As a result, the lens 120 would provide a wider field of view. The lens 120 may be configured in any manner such that it performs the intended function. Multiple lenses, such as 120*a-b* may also be employed to accomplish the intended function. Moreover, one embodiment may involve the use of a fisheye lens, such as is used in photography, to produce a wider field of view. The module 100 may also contain a reticle 180 mounted within the module 100. The reticle 801 may contain markings 190 with a similar function as discussed above.

While this invention is described in conjunction with the specific embodiments outlined above, it is evident that many alternatives, modifications and variations are apparent to those skilled in the art. Accordingly, the embodiments of the invention as set forth above are intended to be illustrative, and in no way limiting. Various changes may be made without departing from the spirit and scope of the invention as defined in the following claims.

I claim:

1. A binocular comprising:
    a first barrel, containing a first optics system having a first objective lens system, wherein said first objective lens system contains a first plurality of objective lenses, a first set of at least two pairs of prisms, a first ocular lens system, wherein said first ocular lens system comprises a first plurality of ocular lenses, further wherein an image received by said first ocular lens system is less than one focal length away from said first objective lens resulting in the production of a magnified image, and being configured to provide a first higher powered magnification which presents a detailed image in a first field of view defined by central image produced by the first optics system;
    a second barrel operatively attached to the first barrel said second barrel containing a second optics system having a second objective lens system, wherein said second objective lens system comprises a second plurality of objective lenses, a second set of at least two pairs of prisms, a second ocular lens system, wherein said second objective lens system comprises a second plurality of ocular lenses, further wherein an image received by said second ocular lens system is less than one focal length away from said second objective lens resulting in the production of a magnified image, and being configured to provide a second lower powered magnification which presents an image of a surrounding environment of said detailed image in a second field of view, said second magnification being less than said first magnification; and
    a reticle in the second barrel corresponding to said first field of view as it appears in the said second barrel, so that the reticle matches the view of said first field of view as it is presented in the second barrel, wherein the second barrel has at least one set of prisms, wherein said second field of view is greater than said first field of view,
        wherein said first field of view and said second field of view are simultaneously presented by the binocular, through the first optics system and the second optics system: and
        further wherein said first field of view and said second field of view are able to be viewed simultaneously by an user without an adjustment to said binoculars.

2. The binocular of claim 1 wherein:
the first and second optics systems each contain a plurality of ocular lenses, said plurality of ocular lenses are independently adjustable to provide zoom magnifying capability.

3. The binocular of claim 1 wherein:
the first optics system provides a magnification power in the range of approximately 8-20×.

4. The binocular of claim 1 wherein:
the first optics system provides a field of view in the range of approximately 100-300 feet at 1000 yards.

5. The binocular of claim 1 wherein:
the second optics system provides a magnification power in the range of approximately 4-7×.

6. The binocular of claim 1 wherein:
the second optics system provides a field of view in the range of approximately 400-600 feet at 1000 yards.

7. The binocular of claim 1 wherein:
the reticle includes cross-hair markings for incrementation of said second field of view.

8. The binocular of claim 1, wherein the first objective lens system comprises a single biconvex converging lens.

9. The binocular of claim 1, wherein the second objective lens system comprises a single biconvex converging lens.

10. The binocular of claim 1, wherein said first plurality of objective lenses have a larger radius of curvature than said second plurality of objective lenses.

* * * * *